United States Patent [19]

Beuscher et al.

[11] 4,382,294

[45] May 3, 1983

[54] TELEPHONE SWITCHING CONTROL ARRANGEMENT

[75] Inventors: Hugo J. Beuscher, Glen Ellyn; Maurice N. Ransom, Naperville, both of Ill.

[73] Assignee: Bell Telephone Laboratories, Incorporated, Murray Hill, N.J.

[21] Appl. No.: 315,005

[22] Filed: Oct. 26, 1981

[51] Int. Cl.³ .......................... H04J 3/12; H04Q 11/04; H04J 3/14
[52] U.S. Cl. ...................................... 370/16; 370/63; 370/110.1; 370/58
[58] Field of Search .................. 370/16, 58, 63, 110.1; 179/18 ES, 175.3 S

[56] References Cited

U.S. PATENT DOCUMENTS

| | | | |
|---|---|---|---|
| 3,920,914 | 11/1975 | Regnier et al. | 370/16 |
| 4,071,702 | 1/1978 | Charransol et al. | 370/16 |
| 4,160,127 | 7/1979 | Slana et al. | 370/16 |
| 4,228,535 | 10/1980 | Workman et al. | 370/16 |
| 4,276,637 | 6/1981 | Ledieu | 370/16 |
| 4,280,217 | 7/1981 | Hafer et al. | 370/63 |
| 4,317,962 | 3/1982 | Cox et al. | 179/18 ES |

*Primary Examiner*—Douglas W. Olms
*Attorney, Agent, or Firm*—K. H. Samples; R. T. Watland

[57] ABSTRACT

A time division switching system which includes a central control, two time-multiplexed switching units each having a control distribution unit associated therewith and a plurality of interface modules each including a selected active control unit. Data words representing subscriber-generated information are conveyed between interface modules by a selected one of the time-multiplexed switching units designated as active. The active time-multiplexed switching unit also conveys control messages between each of the interface modules and the control distribution unit associated with the active time-multiplexed switching unit. However, the time-multiplexed switching unit designated as standby is also used to convey control messages between each of the interface modules and its associated control distribution unit. Each of the control distribution units routes received control messages to the interface modules via its associated time-multiplexed switching unit or to the central control. The central control directs system operation by transmitting and receiving control messages via the time-multiplexed switching units and their associated control distribution units.

13 Claims, 9 Drawing Figures

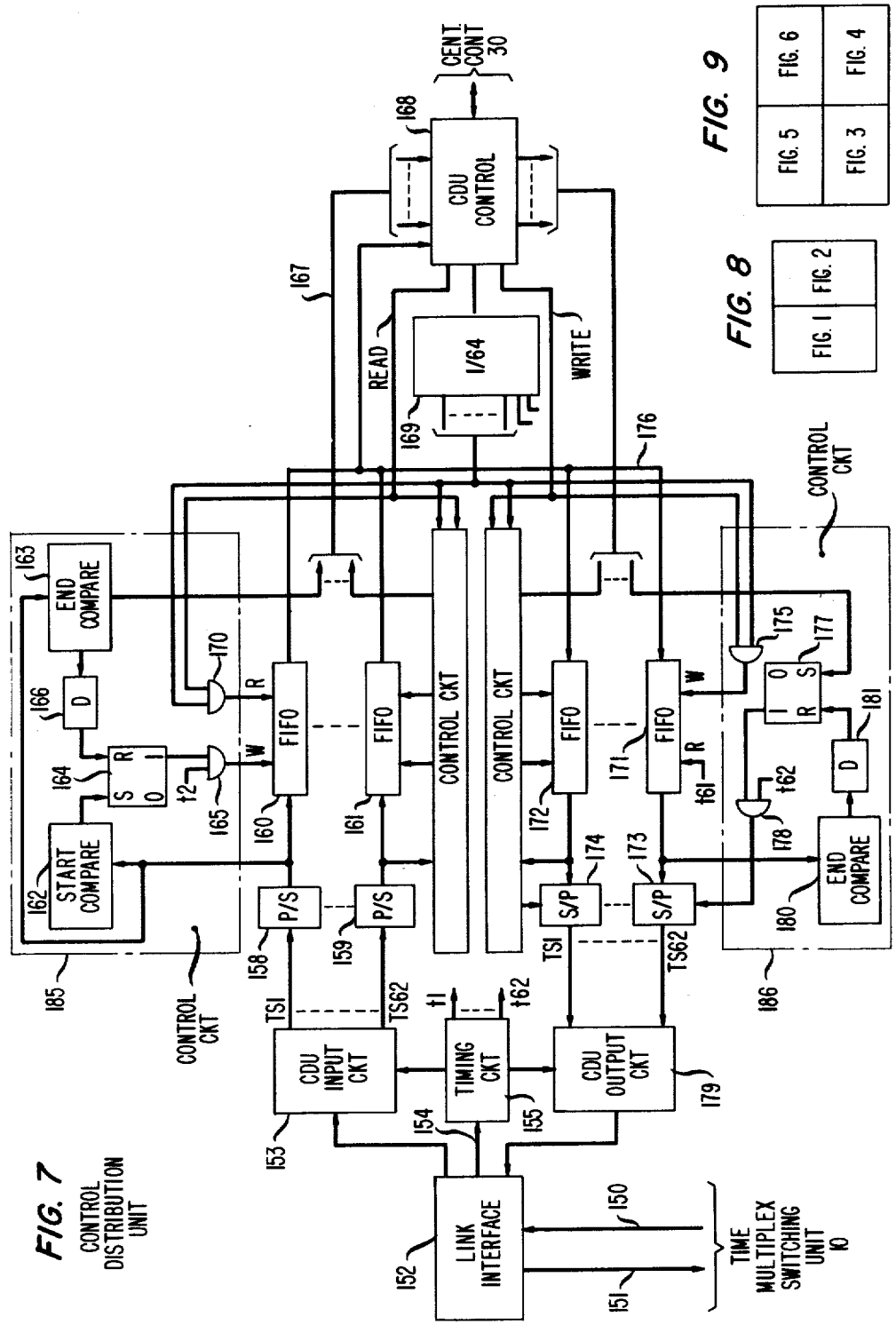

TELEPHONE SWITCHING CONTROL ARRANGEMENT

CROSS-REFERENCE TO RELATED PATENT

The disclosure of U.S. Pat. No. 4,280,217 issued to E. H. Hafer, et al., on July 21, 1981 is hereby incorporated by reference.

TECHNICAL FIELD

This invention relates to distributed control switching systems and, more particularly, to such systems having redundant equipment.

BACKGROUND OF THE INVENTION

Traditionally, stored program controlled communication switching systems have included a single processing entity to control system switching in response to a program stored in memory. As technology and system design evolved, it was found desirable to separate certain routine functions from the main processing entity to save its processing time for more complex system functions and decisions. Today, systems are being designed which also distribute some of the more complex system functions and decisions among several intelligent processors.

The advantages of distributed control in communication switching systems must not be achieved at the expense of system reliability. It is essential, for example, that the integrity of the communication links between processors be maintained despite the failure of a particular system component. The high reliability goals typically set for communication switching systems are frequently met by implementing those systems with redundant hardware. For example, redundant switching networks can be in place wherein an active network handles all traffic until it is determined that it has failed. A standby network then becomes active and handles traffic while the failure is diagnosed and corrective measures are taken. However, in some known distributed control switching systems part of the same switching network used to interconnect subscribers is used to convey control information between processors. Even if redundant switching networks were included in the implementation of such systems, a loss of communication between processors caused by the failure of the active switching network would make system recovery unnecessarily complex and time consuming. The present invention is a distributed control switching system having both active and standby switching networks wherein control links between processors can selectively be maintained through both switching networks such that a control link through the standby network can advantageously be used to achieve rapid system recovery after the failure of the active network.

SUMMARY OF THE INVENTION

A time division switching system in accordance with the present invention includes a first and a second time-shared space division switch, a control circuit and a plurality of interface modules. The control circuit transmits and receives control messages. Each interface module transmits and receives control messages and data words representing subscriber-generated information. The first and second time-shared space division switches and the plurality of interface modules are controlled so that the first time-shared space division switch selectively conveys data words representing subscriber-generated information among the interface modules and conveys control messages among the interface modules and the control circuit and so that the second time-shared space division switch conveys certain ones of the control messages among the interface modules and the control circuit.

One time division switching system, which is described in detail herein to illustrate the principles of the present invention, includes a central control, two time-multiplexed switching units each having a control distribution unit associated therewith and a plurality of interface modules each including a selected active control unit. Data words representing subscriber-generated information are conveyed between interface modules by a selected one of the time-multiplexed switching units designated as active. Control messages transmitted by the active control unit of a given interface module, which are destined for the central control or the active control unit of another interface module, can be conveyed by either of the time-multiplexed switching units and their associated control distribution units. Each of the control distribution units routes received control messages to the interface modules via its associated time-multiplexed switching unit or to the central control. The central control directs system operation by transmitting and receiving control messages via the control distribution units and their associated time-multiplexed switching units. The configuration of control links through time-multiplexed switching units is fully selectable. For example, at one time the configuration may have all control messages conveyed by the active time-multplexed switching unit and at another time the control links may be reconfigured such that all control messages are conveyed by the standby time-multiplexed switching unit. One advantageous configuration has first predetermined ones of the control messages conveyed by the active time-multiplexed switching unit and second predetermined ones of the control messages conveyed by the standby time-multiplexed switching unit. In the event of a failure of the active time-multiplexed switching unit, the central control can expeditiously coordinate system recovery by communicating with the active control units within the interface modules via the active links through the standby time-multiplexed switching unit.

BRIEF DESCRIPTION OF THE DRAWING

A more complete understanding of the present invention may be obtained from a consideration of the following description when read in conjunction with the drawing in which:

FIG. 7 is a circuit diagram of a control distribution unit included in the system shown in FIGS. 1 and 2.

DETAILED DESCRIPTION

Figure 1:
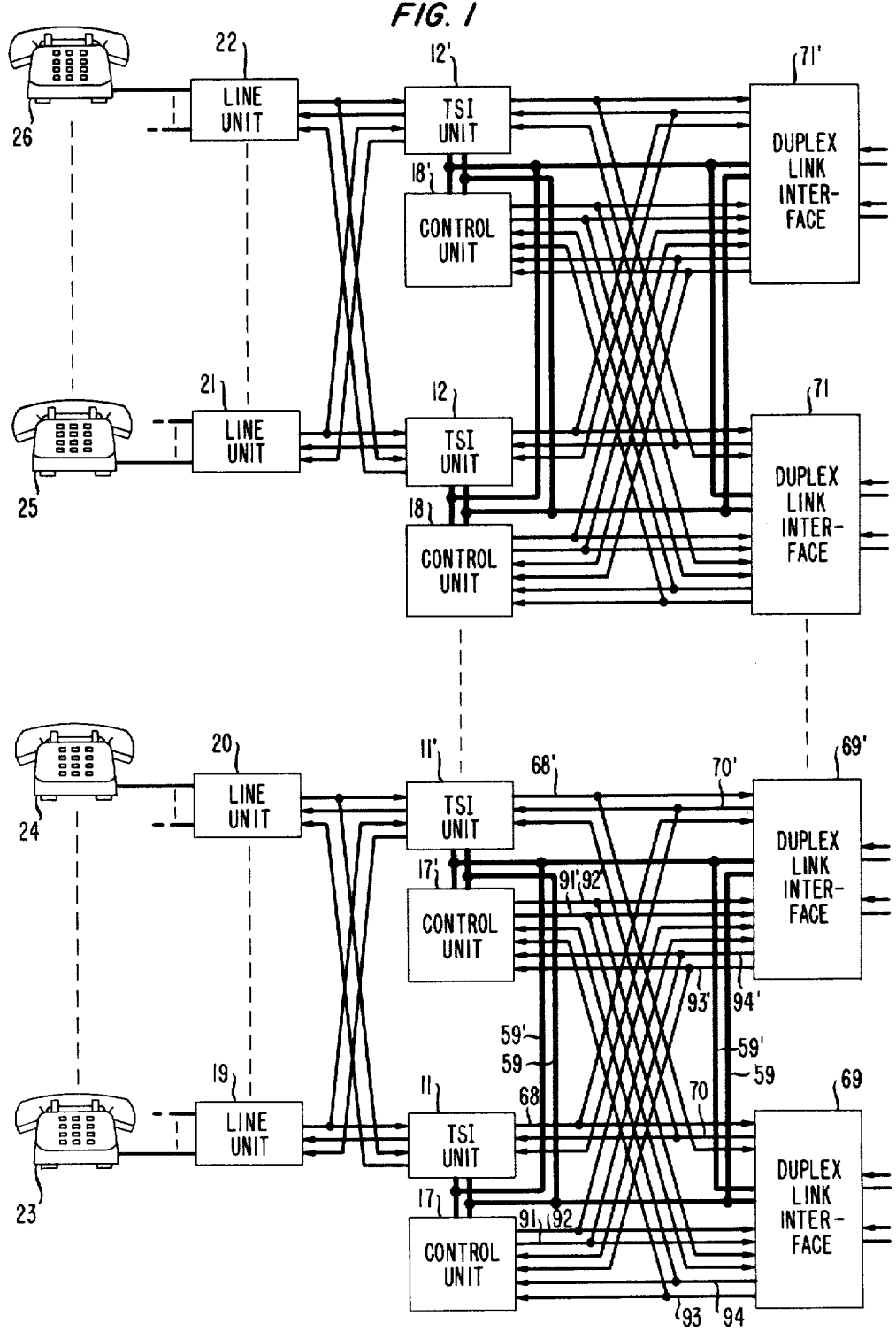
FIGS. 1 and 2, when arranged in accordance with FIG. 8, present a block diagram of a time division switching system illustrating the principles of the present invention.
Figure 2:
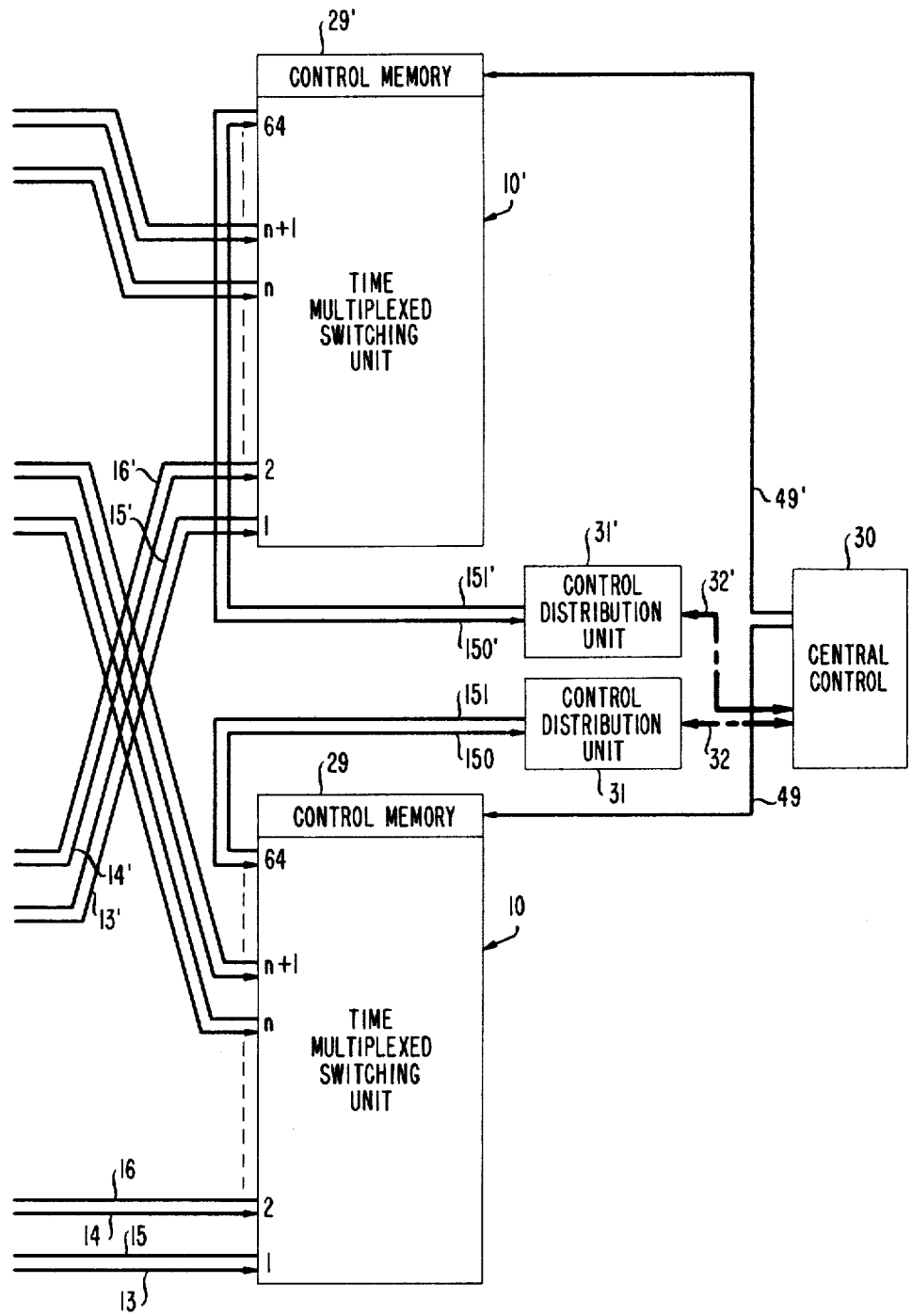

FIGS. 1 and 2, when arranged in accordance with FIG. 8, show a duplicated, time division switching system embodying the present invention which is used to interconnect subscriber sets such as subscriber sets 23 through 26. The embodiment of FIGS. 1 and 2 includes time-multiplexed switching units 10 and 10' each comprising a time-shared space division switch having 64 input ports and 64 output ports. The embodiment further includes 31 pairs of time-slot interchange units of which representative pairs 11, 11' and 12, 12' are specifically shown. Each time-slot interchange unit 11, 11', 12 and 12' includes a bidirectional time-slot interchanger. At any given time, only one of each pair of time-slot interchange units is designated as active, the other unit being designated standby, and only one of the time-multiplexed switching units 10 and 10' is designated as active, the other being designated standby. The active one of time-slot interchange units 11 and 11' transmits data words to two input ports and receives data words from two output ports of the active one of the time-multiplexed switching units 10 and 10' via a corresponding one of a pair of duplex link interfaces 69 and 69'. Similarly, the active one of time-slot interchange units 12 and 12' transmits data words to two input ports and receives data words from two output ports of the active one of the time-multiplexed switching units 10 and 10' via a corresponding one of a pair of duplex link interfaces 71 and 71'. In the present embodiment, time-slot interchange unit 11 is connected to duplex link interface 69 by two time-multiplexed lines 68 and 70 and then to two input ports of time-multiplexed switching unit 10 via two time-multiplexed lines 13 and 14 and to two output ports of time-multiplexed switching unit 10 via two time-multiplexed lines 15 and 16. Time-slot interchange unit 11 is also connected to duplex link interface 69' by time-multiplexed line 68 and a time-multiplexed line 70' and then to two input ports of time-multiplexed switching unit 10' via two time-multiplexed lines 13' and 14' and to two output ports of time-multiplexed switching unit 10' via two time-multiplexed lines 15' and 16'. Similarly, time-slot interchange unit 11' is connected to duplex link interface 69' by two time-multiplexed lines 68' and 70' and then to time-multiplexed switching unit 10' via time-multiplexed lines 13', 14', 15' and 16'. Time-slot interchange unit 11' is also connected to duplex link interface 69 by time-multiplexed lines 68' and 70 and then to time-multiplexed switching unit 10 via time-multiplexed lines 13, 14, 15 and 16. When, for example, time-slot interchange unit 11 and time-multiplexed switching unit 10 are designated active, time-slot interchange unit 11 transmits data words to both duplex link interfaces 69 and 69' but receives data words from only duplex link interface 69. Standby time-slot interchange unit 11' also receives the data words transmitted by duplex link interface 69.

In the description which follows, the input and output ports of time-multiplexed switching units 10 and 10' are referred to as input/output port pairs. This term is used since the source for data words to an input port of a given input/output port pair is also the destination for data words from the output port of that pair. As shown in FIGS. 1 and 2, input/output port pair 1 of time-multiplexed switching unit 10 is associated with time-multiplexed lines 13 and 15. Each time-multiplexed line 13 through 16 and 13' through 16' conveys digital information in 125-microsecond frames each comprising 256 time separated channels. Accordingly, each active time-slot interchange unit transmits and receives up to 512 channels of digital information during each 125-microsecond frame.

Each pair of time-slot interchange units is uniquely associated with a pair of control units of which control units 17 and 17' are associated with time-slot interchange units 11, and 11', and control units 18 and 18' are associated with time-slot interchange units 12 and 12'. At any given time, both time slot interchange units of a pair operate under the control of one control unit of the associated pair of control units, that control unit being designated as active. Additionally, each time-slot interchange unit is connected to a plurality of line units of which line units 19 through 22 are shown in FIGS. 1 and 2 via individual time-multiplexed lines. In the present embodiment line units 19 and 20 are connected to time-slot interchange units 11 and 11' and line units 21 and 22 are connected to time-slot interchange units 12 and 12'. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange units. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange units are determined by the control unit associated with the active time-slot interchange unit.

The relationship of subscriber sets, line units, time-slot interchange units, and duplex link interfaces is substantially the same for each of such groups of interconnected units. Accordingly, while the description which follows relates directly to subscriber set 23, line unit 19, time-slot interchange units 11 and 11' and duplex link interfaces 69 and 69', it shows the relationships for all other groups of such units. Assume for the present example that time-slot interchange unit 11 and time-multiplexed switching unit 10 are designated active and time-slot interchange unit 11' and time-multiplexed switching unit 10' are designated standby. Line unit 19 scans the lines connected to each subscriber set to detect requests for service. When such a request is detected, line unit 19 transmits a message to control unit 17 indicating the request and the identity of the requesting subscriber set. Control unit 17 performs the necessary translation based on the service requested, the identity of the requesting subscriber set and the available equipment, and transmits a message to line unit 19 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels.

After a time-separated channel between line unit 19 and time-slot interchange unit 11 is assigned to a given subscriber set, control unit 17 detects signaling information from the subscriber set by sampling the information transmitted in the assigned channel. Control unit 17 responds to the signaling information from the subscriber's channel, and to control messages from other control units, e.g., 18, and a central control unit 30, by controlling the time-slot interchange function of the time-slot interchange unit 11. The appropriately rearranged data words are then transmitted to duplex link interfaces 69 and 69' which correspond to active time-multiplexed switching unit 10 and standby time-multiplexed switching unit 10', respectively. As previously stated, each time-multiplexed line between a duplex link interface and the time-multiplexed switching unit 10 has 256 channels each 125-microsecond frame. These channels are assigned numerical designations from 1 to 256 in sequence as they occur. This sequence of channels recurs so that a given channel will be available every 125 microseconds. The time-slot interchange and duplex link interface functions take the data words received from the line units and place them in channels on the time-multiplexed lines between the duplex link interfaces and time-multiplexed switching unit 10 under the control of control unit 17.

Time-multiplexed switching units 10 and 10' are substantially identical and each operates in recurring frames of time slots where each 125-microsecond frame comprises 256 time slots. During each time slot, time-multiplexed switching unit 10, for example, is capable of connecting data words received at any of its 64 input ports to any of its 64 output ports in accordance with time-slot control information stored in a control memory 29. The configuration pattern of connections through time-multiplexed switching unit 10 repeats itself every 256 time slots and each time slot is assigned a numerical designation in sequence from 1 to 256. Accordingly, during a first time slot TS1 the information in a channel (1) on time-multiplexed line 13 may be switched by time-multiplexed switching unit 10 to an output port 64 while during the next time slot TS2 the next channel (2) on time-multiplexed line 13 may be switched to an output port n. Time-slot control information is written into control memory 29 via a communication path 49 by central control 30 which derives this control information from control messages obtained from various control units, e.g., 17 and 18. The same time-slot control information that is written into control memory 29 is also written into a control memory 29' in time-multiplexed switching unit 10' via a communication path 49'.

Central control 30 and the control units 17 and 18 exchange control messages utilizing selected channels called control channels of the time-multiplexed lines, e.g., 13 through 16 and 13' through 16', between the duplex link interfaces and time-multiplexed switching units 10 and 10'. In the present embodiment, each control message comprises a plurality of control words and each control channel can transmit one control word per frame of 256 time-separated channels. The same channel of the two time-multiplexed lines associated with a given input/output port pair is predefined to be a control channel. Additionally, a given channel is used as a control channel for only one pair of time-multiplexed lines to a given time-multiplexed switching unit. For example, if channel 1 is used as a control channel on time-multiplexed line 13 and the associated time-multiplexed line 15, no other time-multiplexed line to time-multiplexed switching unit 10 will use channel 1 as a control channel. Similarly, if channel 1 is used as a control channel on time-multiplexed line 13' and the associated time-multiplexed line 15', no other time-multiplexed line to time-multiplexed switching unit 10' will use channel 1 as a control channel. During each time slot having the same numerical designation as a control channel, time-multiplexed switching unit 10 connects the data word occupying that control channel to the 64th output port and connects the 64th input port to the output port associated with the above-mentioned control channel. The following is an example of the operation of the present embodiment when channel 1 is the control channel for time-multiplexed lines 13 and 15, and channel 2 is the control channel for time-multiplexed lines 14 and 16. During time slot TS1 information from control memory 29 defines, among other connections, that the control word in channel 1 of time-multiplexed line 13 is connected to output port 64 and that the control word in channel 1 at input port 64 is connected to time-multiplexed line 15. Similarly, during time slot TS2, information from control memory 29 defines that the control word in channel 2 of time-multiplexed line 14 is connected to the output port 64 and that the control word in channel 2 at the input port 64 is connected to time-multiplexed line 16. When operating in this manner, output port 64 receives from time-multiplexed switching unit 10 all control words in a channel having the same numerical designation in which they were transmitted to the time-multiplexed switching unit. Further, each control channel is connected to receive control words from input port 64 during the time slot having the same numerical designation as their associated control channel. Control words switched to the 64th output port are transmitted to a control distribution unit 31 which temporarily stores them in a location associated with that control channel. The association of control channels with storage locations in control distribution unit 31 identifies the source of the information stored.

Each control message from a control unit, e.g. 17, comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port 64 of time-multiplexed switching unit 10 in a channel having the same numerical designation as the control channel associated with the destination unit.

When operating as above-described, control unit 17 transmits control messages to control unit 18 by transmitting control words during its recurring control channel to form a control message having a destination portion identifying control unit 18. Control distribution unit 31 accumulates the control words, interprets the destination portion, and retransmits the message to the input port 64 during the channel having the same numerical designation as the control channel associated with control unit 18. A control message can also be transmitted to the central control 30 by defining central control 30 in the destination portion of the control message. When this occurs, control distribution unit 31 transmits the message to central control 30 via a communication link 32 rather than returning it to time-multiplexed switching unit 10. Similarly, a message may be transmitted from central control 30 to one of the control units by transmitting to the control distribution unit 31 a control message having a destination portion defining the particular control unit, e.g. 17. This transmission is also accomplished utilizing communication link 32. As an example, central control 30 generates and transmits control messages comprising status designations indicating the active or standby status of time-multiplexed switching units 10 and 10'.

Each of the control units, e.g., 17, 17', 18 and 18', includes a memory 57 (FIG. 3) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57, e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through the control distribution unit 31 is utilized to send this call related information to other control units and the central control.

To gain an understanding of the interaction of the various duplicated parts of the system, assume that time-slot interchange unit 11, its associated control unit 17, time-multiplexed switching unit 10 and its associated duplex link interface 69 are designated active and that time-slot interchange unit 11', its associated control unit 17', time-multiplexed switching 10', and its associated duplex link interface 69' are designated standby. Active time-slot interchange unit 11 transmits data words received from line units to both duplex link interfaces 69 and 69' via 512-channel time-multiplexed line 68. Standby time-slot interchange unit 11' similarly transmits data words to both duplex link interfaces 69 and 69' via 512-channel time-multiplexed line 68'. Each duplex link interface 69 and 69' selects, under the control of control unit 17, the one of the time-multiplexed lines 68 and 68' connected to the active time-slot interchange unit—in the present example, line 68—from which data words are received for further transmission. Active control unit 17 transmits two control words per frame, one word on each of two conductors 91 and 92, to both duplex link interfaces 69 and 69'. Standby control unit 17' is connected to both duplex link interfaces 69 and 69' via two conductors 91' and 92', which are used to transmit control words when control unit 17' is active. Logic zeroes are present on conductors 91' and 92' when control unit 17' is standby. Each duplex link interface 69 and 69' selects, under the control of control unit 17, two of the four conductors 91, 92, 91', 92' on which control words are received for further transmission. For example, duplex link interface 69 may select conductors 91 and 92' and duplex link interface 69' may select conductors 91' and 92. Each duplex link interface 69 and 69' splits the data words received on 512-channel time-multiplexed line 68 for transmission to time-multiplexed switching unit 10 on two 256-channel time-multiplexed lines. Duplex link interface 69 then inserts the control word received from control unit 17 on conductor 91 in time slot TS1 on 256-channel time-multiplexed line 13 and inserts the logic zero received from control unit 17' on conductor 92' in time slot TS2 on 256-channel time-multiplexed line 14. Similarly, duplex link interface 69' inserts the logic zero received from control unit 17' on conductor 91' in time-slot TS1 on 256-channel time-multiplexed line 13' and inserts the control word received from control unit 17 on conductor 92 in time slot TS2 on 256-channel time-multiplexed line 14'. As has been discussed, active time-multiplexed switching unit 10 cycles through a pattern of connections between ports under the control of control memory 29. Although designated standby, time-multiplexed switching unit 10' cycles through the same pattern of connections between ports under the control of a control memory 29'. In accordance with the present example, the control words transmitted by control unit 17 on conductor 91 pass through duplex link interface 69 and active time-multiplexed switching unit 10 to control distribution unit 31 and the control words transmitted by control unit 17 on conductor 92 pass through duplex link interface 69' and standby time-multiplexed switching unit 10' to control distribution unit 31'. In a typical example, the control link through time-multiplexed switching unit 10 may be used for messages concerning call processing and the control link through time-multiplexed switching unit 10' may be used for administrative and maintenance messages.

The flow of control messages from control distribution units 31 and 31' to active control unit 17 is substantially the reverse of the sequence just described. Call processing related control words destined for control unit 17 are transmitted from control distribution unit 31 to time-multiplexed switching unit 10 and placed in time slot TS1 on 256-channel time-multiplexed line 15. Similarly, administrative and maintenance related control words destined for control unit 17 are transmitted from control distribution unit 31' to time-multiplexed switching unit 10' and placed in time slot TS2 on 256-channel time-multiplexed line 16'. Logic zeroes are inserted in time slot TS2 on 256-channel time-multiplexed line 16 and in time slot TS1 on 256-channel time-multiplexed line 15'. Duplex link interface 69 combines the data words on 256-channel lines 15 and 16 and transmits them to time-slot interchange units 11 and 11' on 512-channel time-multiplexed line 70. The control words received from time-multiplexed switching unit 10—in the present example, a call processing related control word in time slot TS1 on line 15 and a logic zero in time slot TS2 on line 16—are extracted by duplex link interface 69 and transmitted to both control units 17 and 17' on conductors 93 and 94. Similarly, duplex link interface 69' combines the data words on 256-channel lines 15' and 16' and transmits the combined data stream to time-slot interchange units 11 and 11' via 512-channel time-multiplexed line 70'. Duplex link interface 69' also extracts the control words from time-multiplexed switching unit 10'—in the present example, a logic zero in time slot TS1 on line 15' and an administrative or maintenance related control word in time slot TS2 on line 16'—and transmits them to both control units 17 and 17' on conductors 93' and 94'. Time-slot interchange unit 11 selects, under the control of control unit 17, the one of the two time-multiplexed lines 70 and 70' connected to the active duplex link interface—in the present example, line 70—from which data words are received. Similarly, time-slot interchange unit 11', also under the control of control unit 17, selects line 70 from active duplex link interface 69. Control unit 17 also selects two of the four conductors 93, 94, 93' and 94' upon which the call processing related control word and the administrative or maintenance related control word are transmitted from duplex link interfaces 69 and 69', respectively—in the present example conductors 93 and 94'. Control unit 17' is similarly capable of selecting two of the four conductors 93, 94, 93' and 94' when it is in the active mode. Although both time-slot interchange units 11 and 11' transmit data words to each line unit, e.g., 19 and 20, the line units select data words from the active time-slot interchange unit 11 for transmission to subscriber sets.

In the example just described, speech-representing data words are transmitted between line unit 19 and time-multiplexed switching unit 10 via time-slot interchange unit 11 and duplex link interface 69. However, control links are maintained from control unit 17 to both control distribution units 31 and 31'—the link to control distribution unit 31 being via duplex link interface 69 and time-multiplexed switching unit 10 and the link to control distribution unit 31' being via duplex link interface 69' and time-multiplexed switching unit 10'. In the event that time-multiplexed switching unit 10 fails, central control 30 can still communicate with control unit 17 via control distribution unit 31', time-multiplexed switching unit 10', and duplex link interface 69'. In a typical scenario, central control 30 sends a message to control unit 17 indicating the failed status of time-multiplexed switching unit 10. Control unit 17 responds to the message by changing the selections made within time-slot interchange units 11 and 11', duplex link interfaces 69 and 69', and control unit 17 itself such that speech-representing data words are transmitted between line unit 19 and time-multiplexed switching unit 10' via time-slot interchange unit 11 and duplex link interface 69'. Under this circumstance, two control links can be maintained between control unit 17 and control distribution unit 31' via duplex link interface 69' and time-multiplexed switching unit 10'.

Figure 3:
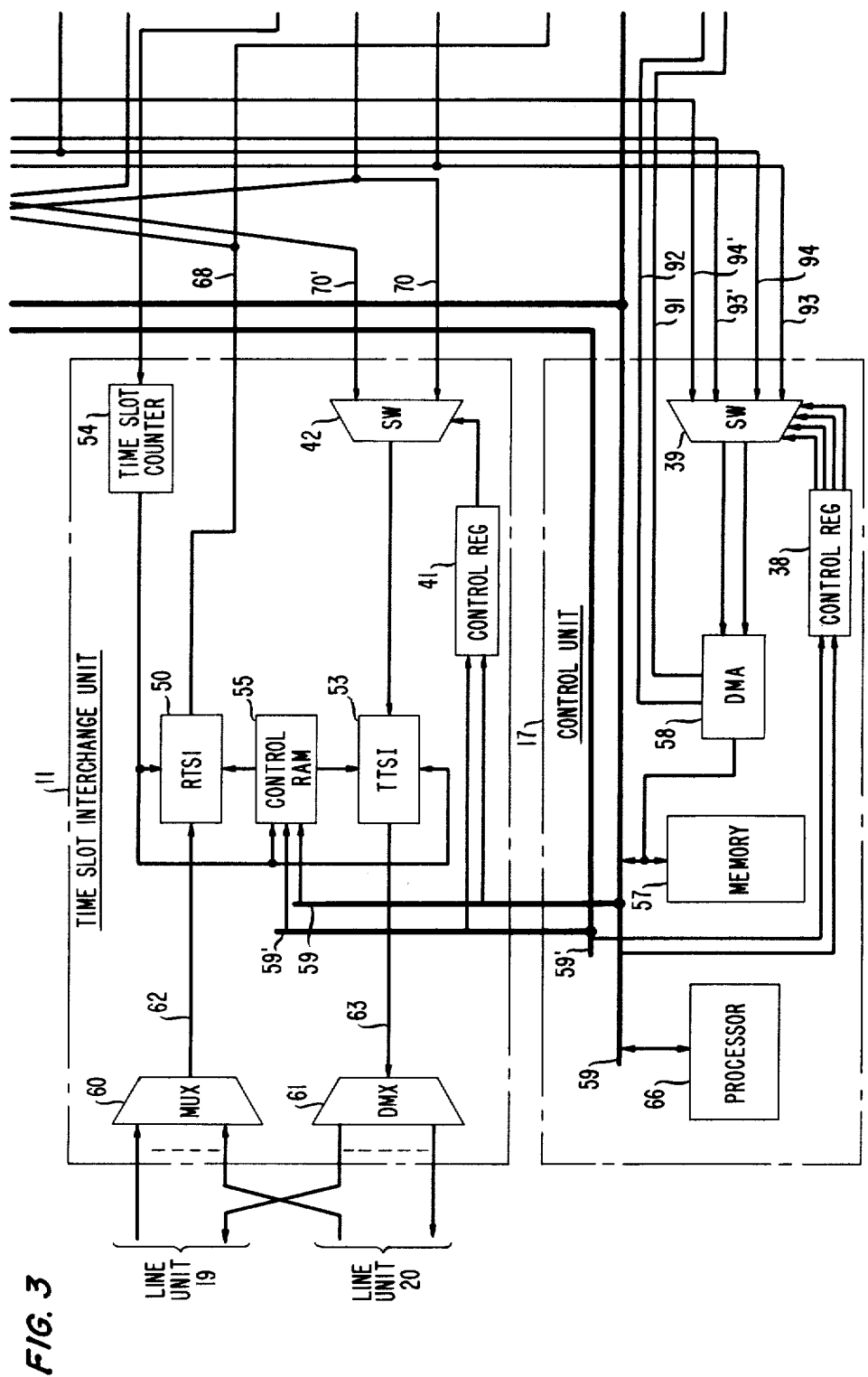
FIGS. 3 through 6, when arranged in accordance with FIG. 9, present a more detailed diagram of portions of the system shown in FIGS. 1 and 2.

FIGS. 3 through 6, when arranged in accordance with FIG. 9, show time-slot interchange units 11 and 11', control units 17 and 17', duplex link interfaces 69 and 69' and the interconnections therebetween in greater detail. Since time-slot interchange unit 11 and control unit 17 shown in FIG. 3 are respectively substantially identical to time-slot interchange unit 11' and control unit 17' shown in FIG. 5, corresponding component parts are identified by the same number in both FIG. 3 and FIG. 5. Similarly, corresponding component parts of substantially identical duplex link interfaces 69 and 69', shown in FIG. 4 and FIG. 6, respectively, are identified by the same number in both of those figures. In the description which follows, reference to a particular component is made by including a parenthetical reference to the appropriate figure.

Since time-slot interchange units 11 and 11' are substantially identical, only unit 11 (FIG. 3) is described herein. The output of each of eight line units, e.g., 19, 20, consists of recurring frames each comprising 64 digital channels of 16 bits each. This information is transmitted to a multiplexer 60 within time-slot interchange unit 11. Multiplexer 60 receives the output signals from the eight line units which signals are reformatted and transmitted on an output time-multiplexed line 62 having 512 channels for each 125-microsecond frame. Similarly, a demultiplexer 61 receives 512 channels of 16-bits each on a time-multiplexed line 63 from a transmit time-slot interchange 53 which channels are distributed in a predetermined arrangement to the eight line units. The information transmitted in a given channel on time-multiplexed line 62 is stored in a receive time-slot interchange 50 in a memory location uniquely associated with that given channel.

Figure 4:
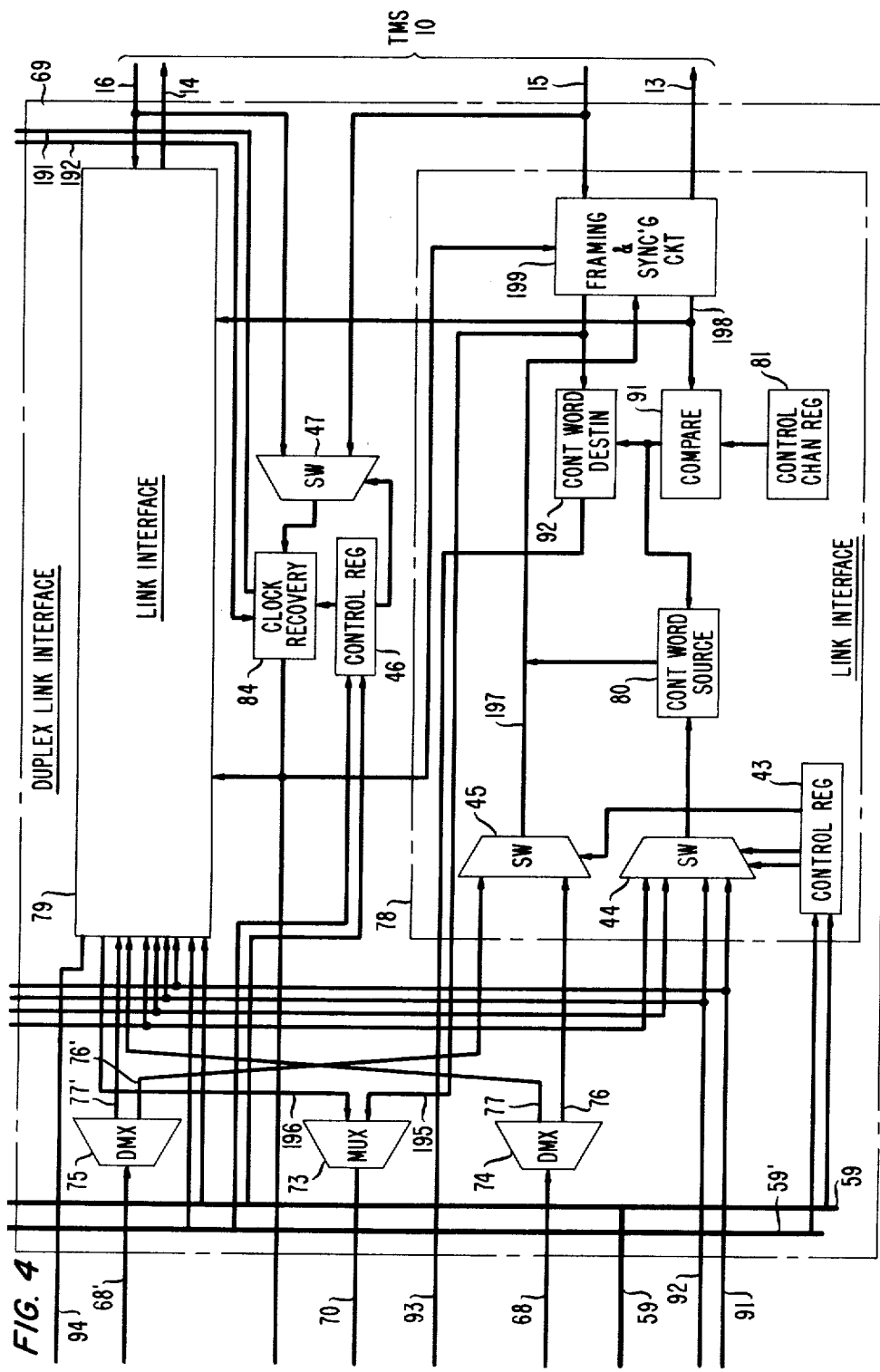
Figure 5:
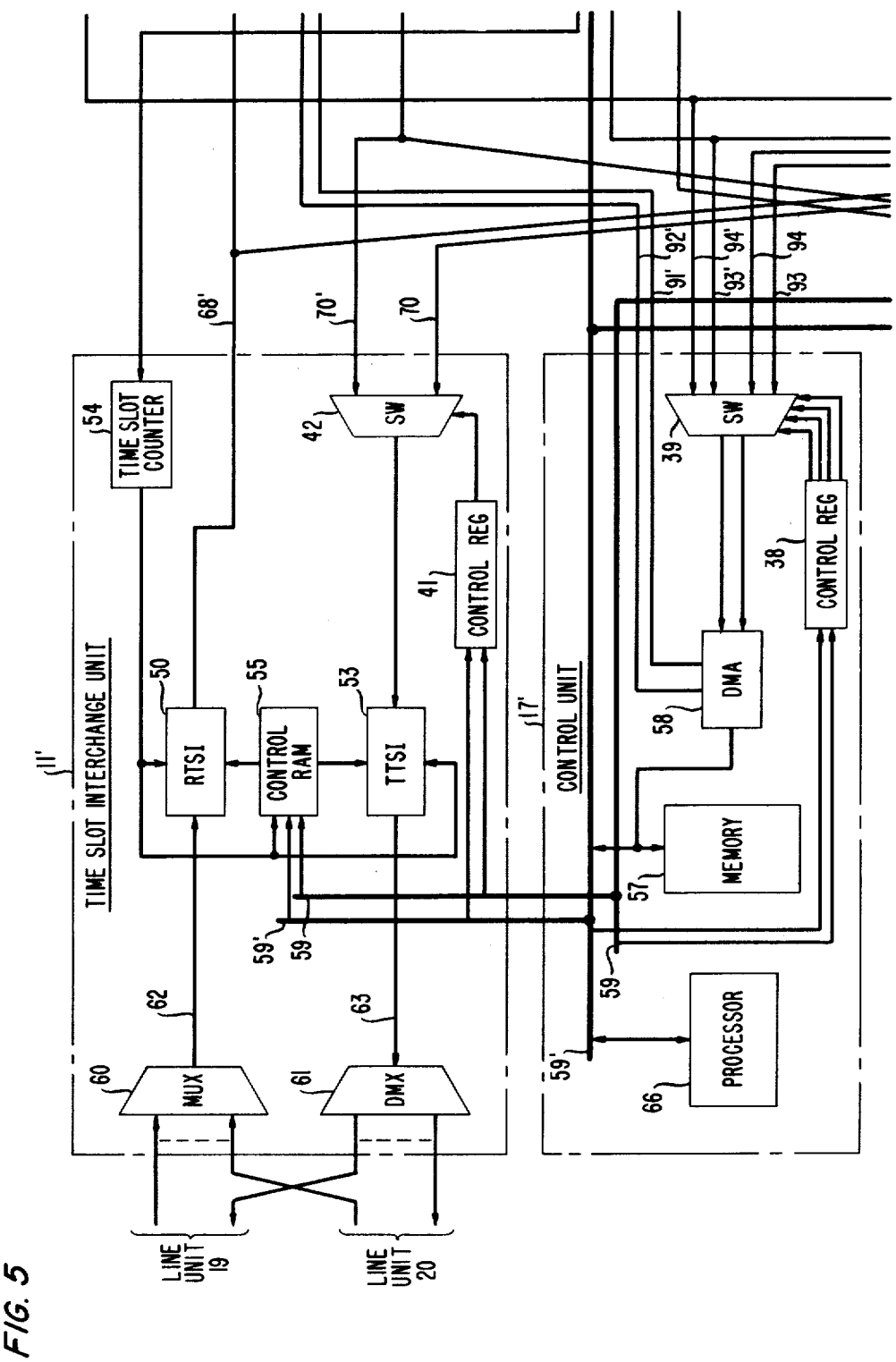

The particular memory location into which a given data word is stored is defined by time-slot designation signals generated by a time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchange 50 which is to store that data word. Data words are also read from receive time-slot interchange 50 at the range of one data word per time slot. The memory address of the data word to be read from receive time-slot interchange 50 during a given time slot is obtained by reading a control RAM 55. Control RAM 55 is read once per time slot at an address defined by the time-slot designation from time-slot counter 54 and the quantity so read is transmitted to receive time-slot interchange 50 as the read address for that time slot. Data words read from receive time-slot interchange 50 are transmitted to duplex link interfaces 69 (FIG. 4) and 69' (FIG. 6) via time-multiplexed line 68. Data words from duplex link interfaces 69 and 69' are received on 512-channel time-multiplexed lines 70 and 70'. A switch 42 (FIG. 3), controlled by one bit in a control register 41 (FIG. 3), selects the one of the two lines 70 and 70' corresponding to the active duplex link interface to be connected to transmit time-slot interchange 53 (FIG. 3) which stores the incoming data words in a location defined by an address from control RAM 55 (FIG. 3). Processor 66 of active control unit 17 (FIG. 3) writes the proper bit into control register 41 (FIG. 3) via a bus 59 to indicate the active status of time-multiplexed switching unit 10 (FIG. 2) and duplex link interface 69 (FIG. 4). Data words are read from transmit time-slot interchange 53 (FIG. 3) at the address defined by time-slot counter 54 (FIG. 3). Data words so read are transmitted on time-multiplexed line 63 for transmission to line units. It should be noted that control RAM 55 (FIG. 3) may be implemented as a number of control memories each associated with a particular circuit, e.g., transmit time-slot interchange 53 (FIG. 3). The particular configuration of control memories is not important to the present invention and may vary depending on timing and circuitry requirements within time-slot interchange unit 11 (FIG. 3). The general principles of time-slot interchange as performed by receive time-slot interchange 50, control RAM 55, time-slot counter 54 and transmit time-slot interchange 53 are well known in the art and are not described in greater detail herein. One arrangement for reading and writing data words in time-slot memories is described in detail in U.S. Pat. No. 4,035,584, J. W. Lurtz.

Figure 6:
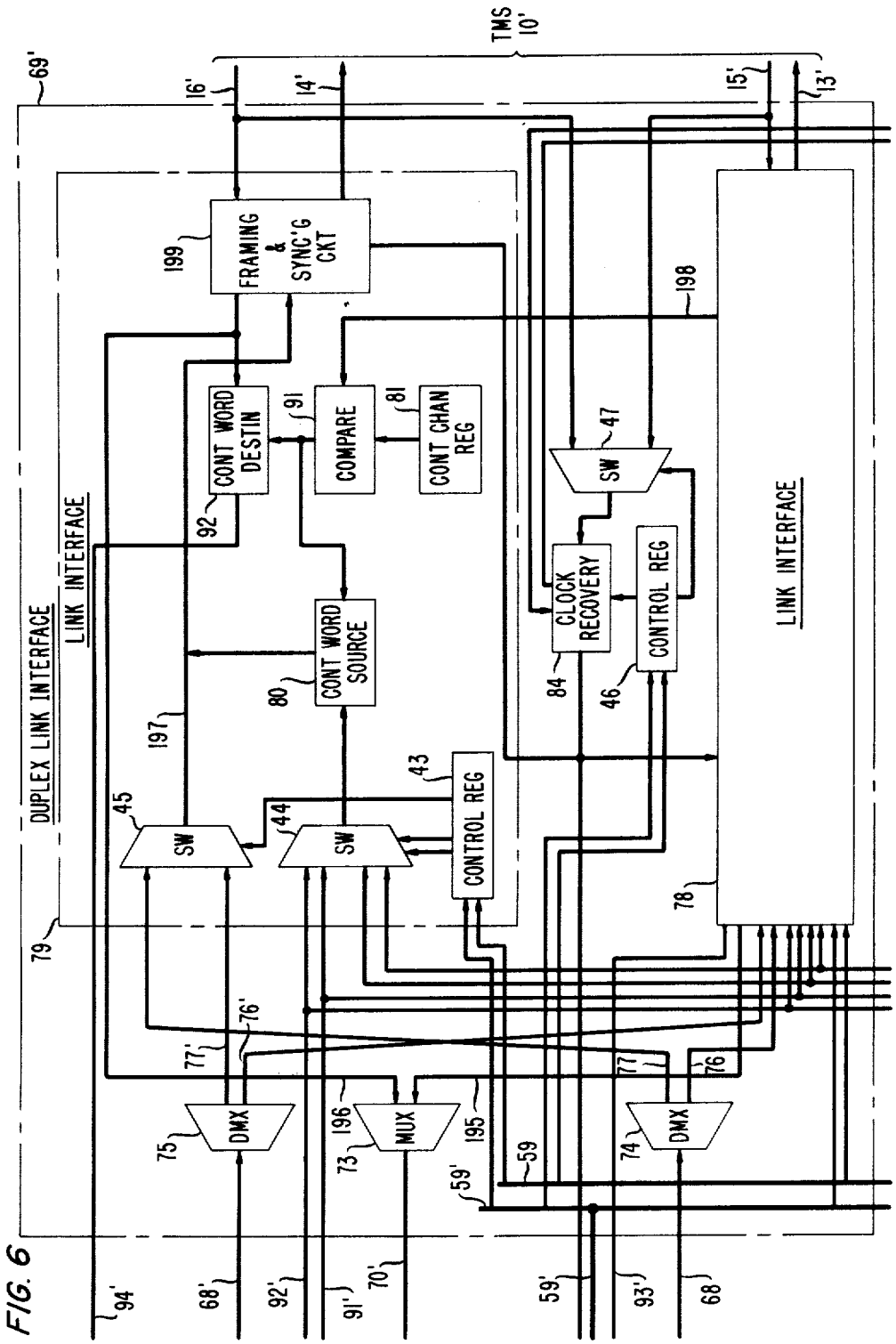

The following is a description of the primary mode of communication between the various control entities of the switching system. Consistent with the present example, assume that time-slot interchange unit 11, its associated control unit 17, time-multiplexed switching unit 10 and its associated duplex link interface 69 are designated active and that time-slot interchange unit 11', its associated control unit 17', time-multiplexed switching 10', and its associated duplex link interface 69' are designated standby. Processor 66 of active control unit 17 (FIG. 3), in response to a complete dialed number, performs translations with regard to that dialed number and formulates a call processing message for central control 30 (FIG. 2) so that an idle time slot for the call can be established through time-multiplexed switching unit 10 (FIG. 2). Processor 66 (FIG. 3) may also formulate an administrative or maintenance message. These control messages are stored in memory 57 (FIG. 3) by processor 66 (FIG. 3). A direct memory access (DMA) unit 58 (FIG. 3) of a type well known in the art reads each of the messages at the rate of one control word per frame. DMA unit 58 (FIG. 3) transmits each call processing control word to two link interfaces 78 and 79 in each duplex link interface 69 (FIG. 4) and 69' (FIG. 6) via a conductor 91. Similarly, DMA unit 58 (FIG. 3) transmits each administrative or maintenance control word to link interfaces 78 and 79 in each duplex link interface 69 (FIG. 4) and 69' (FIG. 6) via a conductor 92. Conductors 91 and 92 are connected to two of four input terminals of each of four switches 44, one switch 44 being included in each link interface 78 and 79 in each duplex link interface 69 (FIG. 4) and 69' (FIG. 6). (Only two of the four switches 44 are shown in FIGS. 4 and 6.) The other two input terminals of each switch 44 (FIGS. 4 and 6) are connected to DMA unit 58 in standby control unit 17' (FIG. 5) via two conductors 91' and 92', which are used to transmit control messages when control unit 17' is active and which transmit logic zeroes when control unit 17' is standby. Each switch 44 (FIGS. 4 and 6), controlled by two bits in an associated control register 43 (FIGS. 4 and 6), selects one of the four conductors 91, 92, 91' and 92' to be connected to a control word source register 80 (FIGS. 4 and 6). Processor 66 of active control unit 17 (FIG. 3) writes via bus 59 the proper bits into each of the control registers 43 (FIGS. 4 and 6) to determine the selections made by the associated switches 44 (FIGS. 4 and 6). In accordance with the present example, conductor 91 is connected to the control word source register 80 in link interface 78 of duplex link interface 69 (FIG. 4) and conductor 92 is connected to the control word source register 80 in link interface 79 of duplex link interface 69' (FIG. 6). Similarly, conductor 91' is connected to the control word source register 80 (not shown) in link interface 78 of duplex link interface 69' (FIG. 6) and conductor 92' is connected to the control word source register 80 (not shown) in link interface 79 of duplex link interface 69 (FIG. 4). Duplex link interface 69 (FIG. 4) includes a multiplexer 73, two demultiplexers 74 and 75 and two link interfaces 78 and 79. Demultiplexer 74 (FIG. 4) is connected to receive data words from the receive time-slot interchanger 50 in time-slot interchange unit 11 (FIG. 3), via time-multiplexed line 68. Demultiplexer 75 (FIG. 4) is connected to receive data words from the receive time-slot interchanger 50 in time-slot interchange unit 11' (FIG. 5) via time-multiplexed line 68'. Multiplexer 73 (FIG. 4) is connected to transmit data words to the transmit time-slot interchanger 53 in each of the time-slot interchange units 11 (FIG. 3) and 11' (FIG. 5) via time-multiplexed line 70. Since the relationship of time-slot interchange unit 11 (FIG. 3), multiplexer 73 (FIG. 4), demultiplexer 74 (FIG. 4) and link interfaces 78 and 79 of duplex link interface 69 (FIG. 4), is substantially identical to the relationship of time-slot interchange unit 11' (FIG. 5), multiplexer 73 (FIG. 4), demultiplexer 75 (FIG. 4) and link interfaces 78 and 79 of duplex link interface 69 (FIG. 4), only the former is described in detail herein. Recall that both time-multiplexed lines 68 and 70 convey data words at the rate of 512 channels per 125-microsecond frame. Demultiplexer 74 (FIG. 4) splits the information received on time-multiplexed line 68 into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Multiplexer 73 (FIG. 4) combines the information on two 256-channel time-multiplexed lines 195 and 196 onto the 512-channel time-multiplexed line 70. This combination occurs by alternatingly transmitting the data words from time-multiplexed lines 195 and 196 such that the data words from time-multiplexed line 195 are transmitted in the odd-numbered channels of time-multiplexed line 70 while data words from time-multiplexed line 196 are transmitted in even-numbered channels. In the present embodiment, time-multiplexed lines 76 and 195 are connected to link interface 78 (FIG. 4), and time-multiplexed lines 77 and 196 are connected to link interface 79 (FIG. 4). It should be noted that time-slot interchange unit 11 (FIG. 3) operates on the basis of 512 time slots (channels) per frame while link interfaces 78 (FIG. 4) and 79 (FIG. 4) and time-multiplexed switching unit 10 (FIG. 2) operate on the basis of 256 time slots (channels) per frame. Further, the channels of data words received from and transmitted to time-slot interchange unit 11 (FIG. 3) are in complete synchronism. That is, whenever a channel having a given numerical designation is received by link interface 78 (FIG. 4) from time-slot interchange unit 11 (FIG. 3), both link interfaces 78 (FIG. 4) and 79 (FIG. 4) will be receiving and transmitting channels having the same numerical designation with respect to the time-slot interchange unit 11 (FIG. 3). In order to maintain synchronism after the split, all odd-numbered channels on time-multiplexed line 68 are delayed by demultiplexer 74 (FIG. 4) so that the odd-numbered channel and the immediately following even-numbered channel are transmitted on a respective one of time-multiplexed lines 76 and 77 substantially simultaneously. Similarly, each data word from link interface 79 (FIG. 4) on time-multiplexed line 196 is delayed by multiplexer 73 such that it is transmitted on time-multiplexed line 70 immediately after the data word received by multiplexer 73 from link interface 78 (FIG. 4) on time-multiplexed line 195 substantially simultaneously therewith.

Each link interface includes a switch 45 (FIG. 4 and 6) which selects, under the control of one bit in associated control register 43 (FIGS. 4 and 6), the one of two 256-channel time-multiplexed lines corresponding to the active time-slot interchange unit from which data words are received for further transmission. (Only two of four switches 45 and two of four control registers 43 are shown in FIGS. 4 and 6.) Processor 66 of active control unit 17 (FIG. 3) writes via bus 59 the proper bit into each of the control registers 43 (FIGS. 4 and 6) to indicate the active status of time-slot interchange unit 11 (FIG. 3). In accordance with the present example, switch 45 (FIG. 4) selects line 76 from demultiplexer 74 (FIG. 4) rather than line 76' from demultiplexer 75 (FIG. 4). Switch 45 (FIG. 4) transmits the data words received on line 76 on a 256-channel time-multiplexed line 197 to a framing and synchronizing circuit 199 (FIG. 4). Circuit 199 includes a buffer memory (not shown) to assure that, although the data words received by link interface 78 (FIG. 4) on time-multiplexed line 15 are not necessarily in channel synchronism with the data words transmitted on time-multiplexed line 13, channel synchronism is achieved between time-multiplexed lines 197 and 195. Circuit 199 (FIG. 4) also inserts a framing bit into each data word transmitted on line 13 and checks the framing pattern received on line 15. The operational details concerning circuit 199 (FIG. 4), which are not important to the present invention, are given in the above-incorporated U.S. Pat. No. 4,280,217.

Timing for both link interfaces 78 and 79 in duplex link interface 69 (FIG. 4) is provided by a clock recovery circuit 84 (FIG. 4), which receives the incoming bit stream from either of the two time-multiplexed lines 15 and 16, and recovers a 32.768-megahertz clock signal therefrom. A switch 47 (FIG. 4), controlled by a single bit in an associated control register 46, makes the selection of line 15 or line 16. Processor 66 of active control unit 17 (FIG. 3) writes the appropriate bit into control register 46 (FIG. 4) via bus 59. Since the framing and synchronizing circuits 199 in both link interfaces 78 and 79 in duplex link interface 69 (FIG. 4) receive a common clock signal from clock recovery circuit 84 (FIG. 4), time-multiplexed lines 195 and 196 can be maintained in synchronism even though synchronism is not required on time-multiplexed lines 15 and 16. Further, duplex link interfaces 69 (FIG. 4) and 69' (FIG. 6) are kept in synchronism by having the clock recovery circuits 84 (FIGS. 4 and 6) in duplex link interfaces 69 (FIG. 4) and 69' (FIG. 6) operate in a master/slave mode. The master/slave status of each clock recovery circuit 84 (FIGS. 4 and 6) is controlled by one bit in associated control register 46 (FIGS. 4 and 6). A phase-locked loop (not shown) is included in each clock recovery circuit 84 (FIGS. 4 and 6). When clock recovery circuit 84 in duplex link interface 69 (FIG. 4) is master, it transmits a timing signal to the phase-locked loop of slave clock recovery circuit 84 in duplex link interface 69' (FIG. 6) on a conductor 191 to maintain synchronism. Similarly, when clock recovery circuit 84 in duplex link interface 69' (FIG. 6) is master, it transmits a timing signal to the phase-locked loop of slave clock recovery circuit 84 in duplex link interface 69 (FIG. 4) on a conductor 192. The synchronized clock signals recovered by the clock recovery circuits 84 (FIGS. 4 and 6) drive the time-slot counters 54 (FIGS. 3 and 5) and, therefore, the operation of active time-slot interchange unit 11 (FIG. 3) and standby time-slot interchange unit 11' (FIG. 5) is also synchronized.

Recall that, in the present example, switch 45 (FIG. 4) selects the data words incoming from active time-slot interchange unit 11 (FIG. 3) for transmission to framing and synchronizing circuit 199 (FIG. 4) on 256-channel time-multiplexed line 197. However, the contents of control word source register 80 (FIG. 4) are placed in the predetermined control time slot on line 197. For example, in link interface 78 of duplex link interface 69 (FIG. 4) the call processing related control word received on conductor 91 from DMA unit 58 of control unit 17 (FIG. 3) is placed in time slot TS1 on line 197 (FIG. 4).

The same channel is used in a given link interface to both transmit and receive control messages. The particular channel used by a given link interface to convey control messages is preset and stored in a control channel register 81 (FIGS. 4 and 6). A read address generator (not shown) in framing and synchronizing circuit 199 in link interface 78 (FIGS. 4 and 6) generates a recurring sequence of 256 read addresses in synchronism with the outgoing data words on 256-channel time-multiplexed line 195 for use by both link interfaces 78 and 79 in a given duplex link interface 69 (FIG. 4) or 69' (FIG. 6). Each read address generated by the read address generator of duplex link interface 69 (FIG. 4) is transmitted on a conductor 198 to a comparator 91 (FIG. 4) which compares that read address to the preset control channel designation stored in control channel register 81 (FIG. 4). When comparator 91 (FIG. 4) determines that the instant read address is identical to the control channel designation, it generates a gating signal which is transmitted to control message source register 80 (FIG. 4) and to a control message destination register 92 (FIG. 4). Control word source register 80 (FIG. 4) responds to the gating signal from comparator 91 (FIG. 4) by gating its contents out to time-multiplexed line 197, thus transmitting the control word. Control word destination register 92 (FIG. 4), in response to the gating signal from comparator 91 (FIG. 4), stores the information on time-multiplexed line 195. During that particular channel, the information on time-multiplexed line 195 comprises the contents of the control channel to be utilized by the control unit 17 (FIG. 3). Before the occurrence of the next control channel, the contents of the control word destination register 92 in link interface 78 of duplex link interface 69 (FIG. 4) are transmitted to both control units 17 (FIG. 3) and 17' (FIG. 5) on a conductor 93. Similarly, the contents of the control word destination registers 92 in link interface 79 of duplex link interface 69 (FIG. 4) and in link interfaces 78 and 79 of duplex link interface 69' (FIG. 6) are transmitted to both control units 17 (FIG. 3) and 17' (FIG. 5) on corresponding conductors 94, 93' and 94'. A switch 39 (FIG. 3), included in control unit 17, selects, under the control of four bits in an associated control register 38 (FIG. 3), any two of the four conductors 93, 94, 93' and 94' to be connected to two input terminals of DMA unit 58 (FIG. 3). Processor 66 of active control unit 17 (FIG. 3) writes the appropriate bits into control register 38 (FIG. 3) via bus 59. In accordance with the present example, conductors 93 and 94' are selected and a call processing related control word from link interface 78 of duplex link interface 69 (FIG. 4) and an administrative or maintenance related control word from link interface 79 of duplex link interface 69' (FIG. 6) are transmitted to memory 57 (FIG. 3) by the operation of DMA unit 58 (FIG. 3). Control unit 17' (FIG. 5) also includes a switch 39 (FIG. 5) and a control register 38 (FIG. 5) for use when control unit 17' (FIG. 5) is active.

Time-slot interchange units 11 (FIG. 3) and 11' (FIG. 5), control units 17 (FIG. 3) and 17' (FIG. 5), and duplex link interfaces 69 (FIG. 4) and 69' (FIG. 6) are referred to collectively as an interface module. The configuration of data paths and control links, the time slot interchange function of both time-slot interchanges 11 (FIG. 3) and 11' (FIG. 5) and the source of timing within the interface module is controlled by processor 66 of active control unit 17 (FIG. 3) via a bus 59. Processor 66 can control the state of each of the switches 39, 42, 44, 45, 47 (FIGS. 3 through 6) throughout the interface module by writing in the appropriate one of the control registers 38, 41, 43 and 46 (FIGS. 3 through 6). When control unit 17' (FIG. 5) is active, its processor 66 can also write in the control registers 38, 41, 43, and 46 (FIGS. 3 through 6) throughout the interface module via a bus 59'.

In accordance with the present example, one control link is maintained from processor 66 of active control unit 17 (FIG. 3) to active time-multiplexed switching unit 10 (FIG. 2) via conductors 91 and 93 and link interface 78 of duplex link interface 69 (FIG. 4) and one control link is maintained from processor 66 of active control unit 17 (FIG. 3) to standby time-multiplexed switching unit 10' (FIG. 2) via conductors 92 and 94' and link interface 79 of duplex link interface 69' (FIG. 6). In the event of a failure of active time-multiplexed switching unit 10 (FIG. 2), a message is sent to processor 66 of active control unit 17 (FIG. 3) via the control link through standby time-multiplexed switching unit 10' (FIG. 2) and link interface 79 of duplex link interface 69' (FIG. 6). In response to this message, processor 66 of active control unit 17 (FIG. 3) writes into the control register 43 (not shown) in link interface 78 of duplex link interface 69' (FIG. 6) and into control register 38 of control unit 17 (FIG. 3) such that a second control link from processor 66 of control unit 17 (FIG. 3) to time-multiplexed switching unit 10' (FIG. 2) is established via conductors 91 and 93' and link interface 78 of duplex link interface 69' (FIG. 6). Processor 66 of active control unit 17 (FIG. 3) also writes into the control registers 41 (FIGS. 3 and 5) such that both time-slot interchange units 11 (FIG. 3) and 11' (FIG. 5) receive the data words on 512-channel time-multiplexed line 70' from time-multiplexed switching unit 10' (FIG. 2).

Time-multiplexed switching units 10 and 10' (FIG. 2) each include a time-shared space division switch which operates in frames of 256 time slots of approximately 488 nanoseconds each to complete paths between its input and output ports. Control information defining the switching path between the input and output ports to be connected during each time slot is stored in a control memory, e.g., 29, which is read each time slot to establish those connections. Each control time slot is transmitted by time-multiplexed switching unit 10 to the control distribution unit 31 via time-multiplexed lines 150 and 151 which are connected to input/output port pair 64. Since the relationship of time-multiplexed switching unit 10 and control distribution unit 31 is substantially identical to the relationship of time-multiplexed switching unit 10' and control distribution unit 31', only the former is described in detail herein. In the course of the following description, control time slots from a given control unit are referred to as transmit control time slots while control time slots to a given control unit are referred to as receive control time slots. Control distribution unit 31 which is shown in greater detail in FIG. 7 includes a link interface circuit 152 which is substantially identical to framing and synchronizing circuit 199. Each control word received on time-multiplexed line 150 is transmitted in parallel from the link interface circuit 152 to a control distribution unit input circuit 153 in the transmit control time slot associated with that control word. The time slot designation of each control word transmitted to the control distribution unit input circuit 153 is substantially simultaneously transmitted via a communication path 154 to a timing circuit 155. The time-slot designations so transmitted are generated by a read address generator (not shown) of link interface 152. Control distribution unit input circuit 153 is essentially a demultiplexer having one input port and 256 output ports. Each control word received at the input port of control distribution unit input circuit 153 is transmitted to the unique one of 256 output ports defined by the time-slot designation transmitted on communication path 154.

The present embodiment includes thirty-one active control units, e.g., 17, each having access to two transmit and two receive control time slots. Accordingly, the information transmitted to link interface circuit 152 on time-multiplexed line 150 will include at most 62 transmit control time slots. Similarly, time-multiplexed line 151 will convey, at most, 62 control time slots back to time-multiplexed switching unit 10. Control distribution unit input circuit 153 thus requires only 62 active output ports. In the present embodiment these active output ports are associated with the first 62 time slots of a frame and are referred to by the designations TS1 through TS62. The output port of control distribution unit input circuit 153 associated with time slot TS1 is connected to a buffer register 158 and the output port associated with time slot TS62 is connected to a buffer register 159. The control circuitry 185 associated with transmit control time slot TS1 is substantially identical to the control circuitry for the remaining 61 transmit control time slots. Accordingly, only the control circuitry 185 associated with time slot TS1 is described in detail herein. Buffer register 158 is connected to the data input terminal of a first-in/first-out buffer 160 which buffer responds to a logical "1" pulse at its write control terminal W to write into its first storage cell the contents of buffer register 158. In accordance with well-known principles of first-in/first-out buffers, any information placed in the first storage cell "ripples" to the last unoccupied storage cell where it is held until the information is read from the first-in/first-out buffer. First-in/first-out buffer 160 further includes a read control terminal R. In response to a logical "1" pulse at this read control terminal R, the contents of the last memory cell are transmitted from the first-in/first-out buffer and the contents of all other cells of the buffer are shifted one cell toward the output.

Recall that each control message from the time-slot interchange unit, e.g., 11, begins with a start character and ends with an end character. The contents of buffer register 158 are continuously transmitted to a start comparator 162 and an end comparator 163. Start comparator 162 includes a comparison circuit and a register which stores the start character. When the contents of buffer register 158 matches the stored start character, start comparator 162 transmits a logical "1" to the set input of a flip-flop 164. Whenever flip-flop 164 is in the set state, it generates a logical "1" on its logical "1" output terminal which is transmitted to an AND gate 165. The output terminal of AND gate 165 is connected to the write control terminal W of first-in/first-out buffer 160. The other input of AND gate 165 is connected to a terminal $t_2$ of timing circuit 155. Timing circuit 155 transmits from terminal $t_2$ a series of pulses occurring at the rate of one pulse per frame during a time $t_2$ which occurs during time slot TS2. Timing circuit 155 includes a one out of n decoder which receives the time-slot designations transmitted on communication path 154 and applies a logical "1" pulse to the unique one of its 256 output terminals corresponding to the incoming time-slot designation. The particular one of these terminals which receives the logical "1" pulse during time slot TS2 is transmitted as signal $t_2$ to the input of AND gate 165.

After the reception of a start character in buffer register 158, a new control word will be placed in buffer register 158 during time slot TS1 of each frame. Further, each pulse $t_2$ transmitted to control terminal W of first-in/first-out buffer 160 causes the contents of buffer register 158 to be stored in the first storage cell of first-in/first-out buffer 160. This action continues until the end character is stored in buffer register 158.

End comparator 163 includes a comparator circuit and a register storing the end character. End comparator 163 generates a logical "1" output pulse when the character stored in buffer register 158 is found to match the end character stored in end comparator 163. This logical "1" output pulse is transmitted via a delay unit 166 to the reset input of flip-flop 164. Delay unit 166 delays logical "1" pulse for a period of time greater than one time slot. When the logical "1" is received by flip-flop 164, that flip-flop resets causing a logical "0" to be applied to its logical "1" output terminal which inhibits AND gate 165 from transmitted any further $t_2$ timing pulses to the control terminal W of first-in/first-out buffer 160.

End comparator 163 upon the detection of the end character in register 158 also transmits a flag signal to a CDU controller 168 over a bus 167. This flag signal defines that a completed control message has been received by first-in/first-out buffer 160. CDU control 168, in response to each flag signal from control circuit, e.g., 185, reads the entire control message from the first-in/first-out buffer storing that control message. In the present embodiment, CDU control 168 initiates such a reading operation by transmitting a 6-bit code defining which first-in/first-out buffer contains the control message to be read to a one out of 64 decoder 169. One out of 64 decoder 169 responds to the 6-bit code from the control distribution unit control 168 by applying a logical "1" to an AND gate associated with the read control circuitry of the first-in/first-out buffer storing a control message. In the present example, first-in/first-out buffer 160 is storing a control message. Accordingly, the 6-bit code transmitted to one out of 64 decoder 169 defines AND gate 170 which is associated with first-in/first-out buffer 160. In response to this 6-bit code, one out of 64 decoder 169 transmits a logical "1" to AND gate 170. Additionally, control distribution unit controller 168 transmits a series of pulses at a 2-megahertz rate to the other input of AND gate 170. It should be noted that the series of 2-megahertz pulses is also transmitted simultaneously to equivalent AND gates in the other control circuits. Since AND gate 170 is receiving a logical "1" from decoder 169, the 2-megahertz pulses are transmitted by AND gate 170 to the read control terminal R of first-in/first-out buffer 160. In response to each of these pulses a control word is read from first-in/first-out buffer 160 and transmitted to the CDU controller 168 via a bus 176. When the CDU controller 168 detects an end character in the information it receives from bus 176, it terminates the transmission of the 2-megahertz pulses. CDU controller 168 includes a memory circuit which is utilized to store each control word read from one of the receive first-in/first-out buffers, e.g., 160 and 161. When a complete control message is received and stored, the CDU controller 168 reads the destination portion of that control message to determine if the control message is to be transmitted to the central control 30 or to one of the control units, e.g., 17 and 18. When the destination portion of the control message defines the central control 30, control distribution unit control 168 reads the control message from its internal storage and transmits that control message to central control 30 via communication path 32. Alternatively, when the destination portion defines a control unit the control distribution control 168 computes the particular receive control time slot associated with that defined control unit. The particular receive control time slot is determined from a translation table stored within the control distribution unit controller 168.

Control distribution unit 31 in the present embodiment includes a second plurality of first-in/first-out buffers of which first-in/first-out buffers 171 and 172 are shown in FIG. 7. First-in/first-out buffers 171 and 172 are associated with a respective one of output registers 173 and 174. Each first-in/first-out buffer and its associated output register are utilized to transmit control words to the time-multiplexed switch 10 in the receive control time slot associated with the destination defined by each control message. In the present example, it will be assumed that the control message transferred from first-in/first-out buffer 160 to control distribution unit 168 is destined for a module which utilizes time slot 62 (TS62) as a receive control time slot. Control distribution unit transmits to one out of 64 decoder 169 a 6-bit code uniquely defining the control circuitry 186 associated with first-in/first-out buffer 171. The logical "1" generated by one out of 64 decoder 169 is applied to an AND gate 175 the output terminal of which is connected to the write control terminal W of first-in/first-out buffer 171. Additionally, CDU controller 168 begins to read each control word of the control message and apply it to bus 176 which is connected in common to all of the first-in/first-out buffers, e.g., 171 and 172. Substantially, simultaneously with the transmission of each control word to the first-in/first-out buffers, control distribution unit control 168 transmits a logical "1" pulse to AND gate 175 and the equivalent AND gates in each of the other control circuits. Since only AND gate 175 receives a logical "1" from one out of 64 decoder 169, only it passes the logical "1" pulses from control distribution unit controller 168 to terminal W of its associated first-in/first-out buffer 171. In response to each logical "1" pulse received at its write control terminal W, first-in/first-out buffer 171 writes the control word on bus 176 into its input storage cell. As previously described, these control words "ripple" to the output storage position of the buffer. The read control terminal R of first-in/first-out buffer 171 is connected to timing circuit 155 such that it receives signals $t_{61}$. Accordingly, during each $t_{61}$ time slot, the control word in the last storage position of first-in/first-out buffer 171 is transmitted to the output register 173.

CDU controller 168 also transmits a start signal to the set input terminal of flip-flop 177 at the beginning of a control message transmission function. The logical "1" output of flip-flop 177 is applied to an AND gate 178, the output terminal of which is connected to the gating control terminal of output register 173. Additionally, AND gate 178 receives as an input the signal $t_{62}$. Thus, after flip-flop 177 is set, a logical "1" pulse is delivered to output register 173 in response to each signal $t_{62}$. Each control word transmitted to output register 173 is transmitted to a CDU output circuit 179 during the time slot TS62 in response to the $t_{62}$ pulses. Prior to the setting of flip-flop 177, no signals are gated to CDU output circuit 179.

Each control word read from first-in/first-out buffer 171 is also applied to the inputs of an end compare circuit 180 which is substantially identical to the end compare circuit 163. When end compare circuit 180 detects that the character being transmitted from first-in/first-out buffer 171 to output register 173 is the end character, it generates a logical "1" pulse which is transmitted via a delay circuit 181 to the reset terminal of flip-flop 177. Delay circuit 181 delays the logical "1"

pulse from end compare circuit 180 for a period of time greater than one time slot. In this manner, flip-flop 177 is reset to inhibit the transmission of further $t_{62}$ signals to output register 173 after the transmission of the end character.

CDU output circuit 179 is a multiplexer having 256 input ports and one output port. The first 62 of the input ports are each uniquely associated with one of the time-slot output registers, e.g., 173 and 174. In response to time-slot count signals from timing circuit 155 control distribution unit output circuit 179 transmits a control word from one of the output registers, e.g., 173 and 174, to its output port. The output port is in turn connected to link interface circuit 152 which operates as previously described to transmit the control words received thereby to time-multiplexed switching unit 10.

Central control 30 also generates control messages to be transmitted to the control units, e.g., 17 and 18. Each control message generated by central control 30 includes a destination portion defining the particular control unit which is to receive the control message. Control messages are transmitted from the central control 30 to the control distribution unit control 168 via communication path 32. Control distribution unit control 168 stores each control message received from central control 30 and as previously described, reads each stored destination portion to determine the control unit for which the control message is intended. Control distribution unit control 168 transmits control messages from central control 30 in the same manner that it transmits control messages received from the first-in/first-out buffers 160 and 161. Central control 30 communicates with control distribution unit 31' via a communication path 32' in a substantially identical manner.

It is to be understood that the above-described embodiment is merely illustrative of the principles of the invention and that other embodiments may be devised by those skilled in the art without departing from the spirit and scope of the invention. For example the function of control distribution units 31 and 31' may also be advantageously accomplished by a software implementation using a microprocessor.

What is claimed is:

1. A time division switching system comprising
   a control arrangement comprising means for transmitting and receiving control messages,
   a plurality of interface modules each comprising means for transmitting and receiving data words representing subscriber-generated information and for transmitting and receiving control messages,
   a first and a second time-shared space division switch, and
   means for controlling said first and second time-shared space division switches and said plurality of interface modules such that said first time-shared space division switch selectively conveys data words representing subscriber-generated information among said interface modules and conveys control messages among said interface modules and said control arrangement and such that said second time-shared space division switch conveys predetermined ones of said control messages among said interface modules and said control arrangement.

2. A time division switching system comprising two time-shared space division switches,
   means for designating either one of said time-shared space division switches as active and the corresponding other one of said time-shared space division switches as standby,
   a control arrangement comprising control distribution means for transmitting control messages to and receiving control messages from the one of said time-shared space division switches designated as active and for transmitting control messages to and receiving control messages from the one of said time-shared space division switches designated as standby,
   a plurality of interface modules each comprising means for transmitting control messages and data words representing subscriber-generated information to and receiving control messages and data words representing subscriber-generated information from said one of said time-shared space division switches designated as active and for transmitting control messages to and receiving control messages from said one of said time-shared space division switches designated as standby, and
   means for controlling said time-shared space division switches and said plurality of interface modules such that said one of said time-shared space division switches designated as active conveys control messages among said interface modules and said control distribution means and conveys data words representing subscriber-generated information among said interface modules and such that said one of said time-shared space division switches designated as standby conveys control messages among said interface modules and said control distribution means.

3. A time-division switching system comprising
   a control arrangement comprising control distribution means for transmitting and receiving control messages,
   a plurality of interface modules each comprising means for transmitting and receiving data words representing subscriber-generated information and for transmitting and receiving control messages,
   first and second switching means each for selectively conveying data words representing subscriber-generated information and control messages among said plurality of interface modules and said control distribution means,
   means for generating a first status designation and a second status designation,
   wherein each of said plurality of interface modules comprises means responsive to said first status designation for transmitting control messages to and receiving control messages from said first switching means, for transmitting control messages to and receiving control messages from said second switching means, for transmitting data words representing subscriber-generated information to said first switching means and said second switching means and for receiving data words representing subscriber-generated information from said first switching means, and
   wherein each of said plurality of interface modules comprises means responsive to said second status designation for transmitting control messages to and receiving control messages from said first switching means, for transmitting control messages to and receiving control messages from said second switching means, for transmitting data words representing subscriber-generated information to said first switching means and said second switching means and for receiving data words representing subscriber-generated information from said second switching means.

4. A time division switching system comprising
a control arrangement comprising control distribution means for transmitting and receiving control messages,
a plurality of units each comprising means for transmitting and receiving data words representing subscriber-generated information and for transmitting and receiving control messages,
means for generating an active status designation and a standby status designation, and
first and second switching means each connected to said plurality of units and said control distribution means, said first and said second switching means each comprising means responsive to said active status designation for conveying first predetermined ones of said control messages transmitted by said control distribution means and first predetermined ones of said control messages transmitted by said units among said units and said control distribution means and for conveying data words representing subscriber-generated information among said units, and comprising means responsive to said standby status designation for conveying second predetermined ones of said control messages transmitted by said control distribution means and second predetermined ones of said control messages transmitted by said units among said units and said control distribution means.

5. A time division switching system comprising
a first and a second time-shared space division switch,
means for designating either one of said first and said second time-shared space division switches as active and the corresponding other one of said first and said second time-shared space division switches as standby,
a control arrangement comprising control distribution means for transmitting control messages to and receiving control messages from said first time-shared space division switch and for transmitting control messages to and receiving control messages from said second time-shared space division switch, and
a plurality of interface modules each comprising a first switch interface associated with said first time-shared space division switch, a second switch interface associated with said second time-shared space division switch, transmitter means for transmitting data words representing subscriber-generated information to said first and said second switch interfaces, receiver means for receiving data words representing subscriber-generated information from the one of said first and said second switch interfaces associated with the one of said first and said second time-shared space division switches designated as active, and processor means for transmitting and receiving control messages, wherein said first switch interface comprises means for receiving from said transmitter means and transmitting to said first time-shared space division switch data words representing subscriber-generated information and for receiving from said processor means and transmitting to said first time-shared space division switch first predetermined ones of said control messages transmitted by said processor means and means for receiving from said first time-shared space division switch and transmitting to said receiver means data words representing subscriber-generated information and for receiving from said first time-shared space division switch and transmitting to said processor means control messages, and wherein said second switch interface comprises means for receiving from said transmitter means and transmitting to said second time-shared space division switch data words representing subscriber-generated information and for receiving from said processor means and transmitting to said second time-shared space division switch second predetermined ones of said control messages transmitted by said processor means and means for receiving from said second time-shared space division switch and transmitting to said receiver means data words representing subscriber-generated information and for receiving from said second time-shared space division switch and transmitting to said processor means control messages.

6. A time division switching system comprising
a first and a second time-shared space division switch,
means for designating either one of said first and said second time-shared space division switches as active and the corresponding other one of said first and said second time-shared space division switches as standby,
a control arrangement comprising control distribution means for transmitting control messages to and receiving control messages from said first time-shared space division switch and for transmitting control messages to and receiving control messages from said second time-shared space division switch, and
a plurality of interface modules each comprising a first switch interface associated with said first time-shared space division switch, a second switch interface associated with said second time-shared space division switch, first and second transmitter means each for transmitting data words representing subscriber-generated information to said first and said second switch interfaces, first and second receiver means each for receiving data words representing subscriber-generated information from the one of said first and said second switch interfaces associated with the one of said first and said second time-shared space division switches designated as active, and processor means for transmitting and receiving control messages, wherein said first switch interface comprises means for receiving from a selected one of said first and said second transmitter means and transmitting to said first time-shared space division switch data words representing subscriber-generated information and for receiving from said processor means and transmitting to said first time-shared space division switch first predetermined ones of said control messages transmitted by said processor means and means for receiving from said first time-shared space division switch and transmitting to said first and said second receiver means data words representing subscriber-generated information and for receiving from said first time-shared space division switch and transmitting to said processor means control messages, and wherein said second switch interface comprises means for receiving from said selected one of said first and said second transmitter means and transmitting to said second time-shared space division switch data words representing subscriber-generated information and for receiving from said processor means and transmitting to said second time-shared space division switch second predetermined ones of said control messages transmitted by said processor means and means for receiving from said second time-shared space division switch and transmitting to said first and said second receiver means data words representing subscriber-generated information and for receiving from said second time-shared space division switch and transmitting to said processor means control messages.

7. A time division switching system comprising
a first and a second time-shared space division switch,
means for designating either one of said first and said second time-shared space division switches as active and the corresponding other one of said first and said second time-shared space division switches as standby,
a control arrangement comprising control distribution means for transmitting control messages to and receiving control messages from said first time-shared space division switch and for transmitting control messages to and receiving control messages from said second time-shared space division switch, and
a plurality of interface modules each comprising a first switch interface associated with said first time-shared space division switch, a second switch interface associated with said second time-shared space division switch, first and second transmitter means each for transmitting data words representing subscriber-generated information to said first and said second switch interfaces, first and second receiver means each for receiving data words representing subscriber-generated information from the one of said first and said second switch interfaces associated with the one of said first and said second time-shared space division switches designated as active, and first and second processor means each for transmitting and receiving control messages, wherein said first switch interface comprises means for receiving from a selected one of said first and said second transmitter means and transmitting to said first time-shared space division switch data words representing subscriber-generated information and for receiving from a selected one of said first and said second processor means and transmitting to said first time-shared space division switch first predetermined ones of said control messages transmitted by said selected one of said first and said second processor means and means for receiving from said first time-shared space division switch and transmitting to said first and said second receiver means data words representing subscriber-generated information and for receiving from said first time-shared space division switch and transmitting to said selected one of said first and said second processor means control messages, and wherein said second switch interface comprises means for receiving from said selected one of said first and said second transmitter means and transmitting to said second time-shared space division switch data words representing subscriber-generated information and for receiving from said selected one of said first and said second processor means and transmitting to said second time-shared space division switch second predetermined ones of said control messages transmitted by said selected one of said first and said second processor means and means for receiving from said second time-shared space division switch and transmitting to said first and said second receiver means data words representing subscriber-generated information and for receiving from said second time-shared space division switch and transmitting to said selected one of said first and said second processor means control messages.

8. A time division switching system in accordance with claims 2, 3, 4, 5, 6, or 7, wherein said control arrangement further comprises a central control for controlling said switching system including means for generating control messages and transmitting those control messages to said control distribution means and for receiving control messages from said control distribution means and
wherein said control distribution means further comprises means for transmitting control messages to said central control and receiving control messages from said central control.

9. A time division switching system comprising
first and second switching means each having a plurality of input ports and a plurality of output ports for completing communication paths between said input ports and said output ports in time slots of substantially fixed duration,
a plurality of interface modules each connected to predetermined ones of said input ports of said first switching means and connected to predetermined ones of said input ports of said second switching means for transmitting data words representing subscriber-generated information and for transmitting control messages comprising an address portion defining one of said interface modules and each of said interface modules connected to predetermined ones of said output ports of said first switching means and connected to predetermined ones of said output ports of said second switching means for receiving data words representing subscriber-generated information and for receiving control messages,
a control arrangement comprising control distribution means connected to at least one of said input ports of said first switching means and connected to at least one of said input ports of said second switching means for transmitting control messages comprising an address portion defining one of said interface modules and connected to at least one of said output ports of said first switching means and connected to at least one of said output ports of said second switching means for receiving control messages,
means for controlling said plurality of interface modules and said first and said second switching means such that said first switching means conveys data words representing subscriber-generated information between at least two of said interface modules and conveys control messages between at least one of said interface modules and said control distribution means and such that said second switching means also conveys control messages between said at least one of said interface modules and said control distribution means.

10. A time division switching system in accordance with claim 9 wherein said control distribution means further comprises means for transmitting each control message received from said first switching means to said at least one of said input ports of said first switching means in a channel associated with the interface module defined by the address portion of that control message and means for transmitting each control message received from said second switching means to said at least one of said input ports of said second switching means in a channel associated with the interface module defined by the address portion of that control message, wherein said first switching means further includes means for transmitting each control message received in a given channel from said control distribution means to one of said output ports of said first switching means connected to the interface module associated with the given channel, and wherein said second switching means further includes means for transmitting each control message received in a given channel from said control distribution means to one of said output ports of said second switching means connected to the interface module associated with the given channel.

11. A time division switching system in accordance with claim 10 wherein said control arrangement further comprises a central control for controlling said switching system and wherein each of said plurality of interface modules further comprises means for transmitting control messages comprising an address portion defining said central control and said control distribution means further comprises means for transmitting to said central control each control message comprising an address portion defining said central control.

12. A time division switching system in accordance with claim 11 wherein said central control comprises means for generating control messages comprising an address portion defining one of said interface modules and means for transmitting said control messages to said control distribution means.

13. A time division switching system in accordance with claims 9, 10, 11, or 12 wherein each of said control messages comprises at least one control word, and wherein each of said interface modules includes means for transmitting control words to the input ports connected thereto only during transmit control time slots which comprise predetermined ones of the time slots at those input ports and for receiving control words from the output ports connected thereto only during receive control time slots which commprise predetermined ones of the time slots at those output ports.

* * * * *